United States Patent [19]

Szymczyk et al.

[11] Patent Number: 5,255,949
[45] Date of Patent: Oct. 26, 1993

[54] DEVICE FOR USE IN POSITIONING AN ARTICLE PRECISELY IN A DESIRED LOCATION

[75] Inventors: Krzystof F. Szymczyk; Andrew A. Goldenberg, both of Toronto; Jacek A. Wiercienski, Oakville; Bruce L. Godkin, Walton, all of Canada

[73] Assignees: The Governing Council of the University of Toronto, Toronto; Northern Telecom Limited, Montreal, both of Canada

[21] Appl. No.: 774,505

[22] Filed: Oct. 10, 1991

[51] Int. Cl.⁵ .............................................. B65G 35/00
[52] U.S. Cl. ................................ 294/86.41; 294/103.1; 901/39
[58] Field of Search ............... 294/86.4, 86.41, 103.1, 294/119.1; 414/744.8, 783; 901/39

[56] References Cited

U.S. PATENT DOCUMENTS 3,824,674  7/1974  Inoyama et al. ............. 294/86.4 X
4,611,846  9/1986  Feiber et al. ............... 294/119.1 X

FOREIGN PATENT DOCUMENTS 2581914  11/1986  France ........................... 901/39

*Primary Examiner*—Michael S. Huppert
*Assistant Examiner*—Janice Krizek
*Attorney, Agent, or Firm*—R. J. Austin

[57] ABSTRACT

A device for use in placing surface mount components upon PCBs having article gripping elements carried by a support. The article gripping elements are movable between an upper position and a lower position for engaging and gripping the surface mount component. In the lower position, the article gripping elements are freely orientable relative to a vertical axis and the elements and support coact as the elements are being raised to correct the orientation of the elements to that desired.

28 Claims, 16 Drawing Sheets

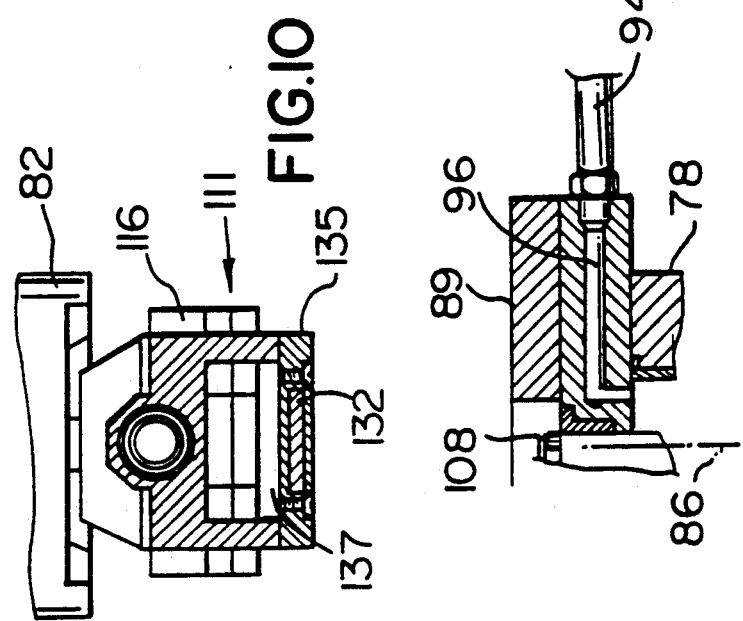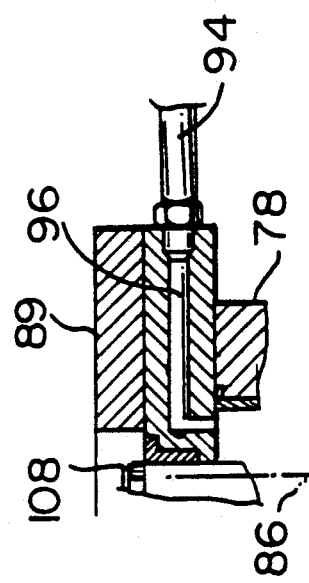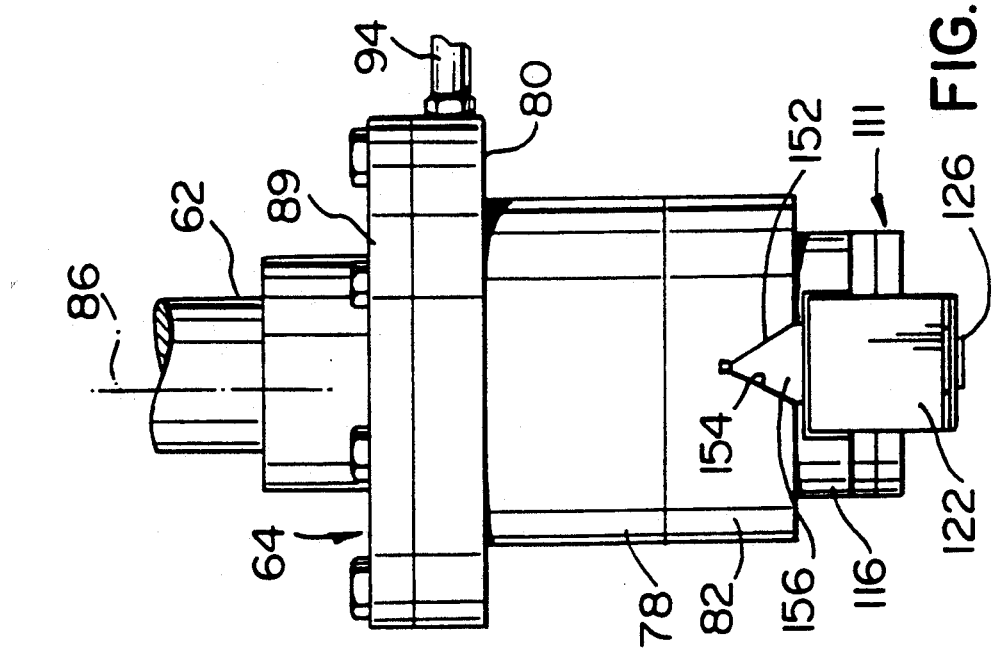

DEVICE FOR USE IN POSITIONING AN ARTICLE PRECISELY IN A DESIRED LOCATION

This invention relates to devices for use in positioning articles precisely in a desired location.

Devices are known for positioning articles precisely in desired locations and positions of orientation. In the electronics field, such devices are used for transporting electronic components from pick-up stations to locate them accurately in desired positions upon printed circuit boards with terminal pins of the components located in holes in the boards. For this purpose, a device provides a robot arm having a free end carrying a transporting gripper normally referred to as a "gripper". The robot arm is operated under a programmed computer control to cause the arm to move in a sequence of operations together with programmed control in orientation of the gripper to deal with the components so as to assemble them accurately into individual desired positions on the board. Alternatively, a plurality of robot arms carrying grippers are used, each for mounting an individual component upon a board, the board being moved along a conveyor intermittently from one component station to another.

In one known method of transporting and assembling components onto a printed circuit board, the components are fed in succession along a feed chute to a pick-up station. To assemble each component into its desired location on the board, the robot arm is pivoted to locate the gripper directly above the pick-up station and the gripper is then lowered to grip the component. The gripper holding the component is raised and the arm is pivotally moved to position the gripper above an assembly station for that component on the board, the gripper then being lowered to locate the component in position on the board with the component pins passing through holes in the board. The gripper is then removed from the component and the board. In this method, the position and orientation of each component in the pick-up station is accurately controlled by the chute in a horizontal plane and, as the gripper is also accurately positioned and oriented by computer operation above the pick-up station, then each component upon being held by the gripper is immediately in a desired location and position of orientation relative to the gripper to enable the component to be precisely located upon the board. While this method of assembly is effective, the cost of the operation is inordinately increased by the initial outlay required for the provision of the chute and associated machine parts, such as tube feeders for feeding the components to the chute. The cost is also increased because of maintenance requirements upon the chute and its associated machine parts to ensure that the components continue to be correctly fed along the chute and into their desired locations and positions of orientation in the pick-up station. Further, maintenance time required for the chute and associated machine parts results in reduced commercial use of the whole apparatus and thus detracts from the efficiency of the process.

In another known method, the components are initially disposed relatively loosely in individual open-topped compartments of a carrying tray with each component disposed possibly slightly out of its desired location and position of orientation in a horizontal plane. Each component is thus located somewhat haphazardly in its own individual pick-up station. A robot arm must be computer controlled to dispose its gripper sequentially and in required order above the pick-up stations to transport the components to their individual assembly stations on a printed circuit board or boards. However, as the components are not located precisely in their desired locations and positions of orientation in the tray, upon being held by the gripper, each component is not located to enable it to be accurately assembled in its desired location and position of orientation upon the printed circuit board. It is thus necessary in this method for the gripper to carry each component from the carrying tray to a position and orientation correction jig into which each component is deposited. Jaws of the jig disposed on each side of the component then move towards each other to engage and move the component horizontally into a desired location and position of orientation so that when the gripper once again descends to grip and raise the component a second time, the component is in a desired location and position of orientation relative to the gripper for the component to be precisely located upon the printed circuit board. Again, while this method of assembly is effective, the correction jig adds to the cost of the apparatus and increases the complexity of operation of the robot arm and gripper. Furthermore, as in the previously referred to prior method, maintenance time is required to ensure that the correction jig continues to operate to dispose successive surface mount components in their desired locations and positions of orientations. Maintenance time to ensure correct operation of the jig results in reduced commercial use Of the apparatus as previously referred to.

The present invention seeks to provide a device for use in positioning an article precisely in a desired location and position of orientation and which in use does not require the use of a chute and associated machine parts nor a position and orientation correction jig.

Accordingly, the present invention provides a device for use in positioning an article precisely in a desired location and position of orientation comprising: an article gripping means and a support carrying the article gripping means; the article gripping means having at least two gripping jaws and being movable between an upper position close to the support and a lower position spaced from the support and in which the article gripping means is angularly orientable relative to a vertical axis of the support to enable the jaws during closing to engage, become correctly positioned relative to, and then grip the article before raising it; and angle orientation correction means for effecting change in the angle of orientation of the gripping means after it has moved out of the lower position whereby, with the gripping means returned to the upper position, the gripping jaws when gripping the article are disposed in desired locations and positions of orientation relative to the vertical axis.

Thus, with the use of the device according to the invention as defined above, if the article is initially incorrectly oriented in a horizontal plane, then the jaws will adjust in position as they engage the article so as to become correctly positioned relative to the article. As the gripper means returns to the upper position, the gripping jaws are changed in angular orientation to the desired locations and positions of orientation relative to the vertical axis whereby the article itself becomes accurately positioned in the device about the vertical axis.

Thus the article is not required to be accurately positioned and orientated before becoming engaged by the gripping jaws, nor is it necessary for the article to be released by the jaws for position and orientation correction. In contrast, the device according to the invention is capable itself of accurately positioning and orienting the article.

Preferably, the orientation correction means is in the form of a pair of opposed and convergent registration surfaces provided on the support and a further pair of such surfaces provided upon the article gripping means. The registration surfaces are inclined relative to the vertical axis in each pair and, with a registration surface of one pair slidable upon a corresponding surface of the other pair as the article gripping means is being moved into the upper position, change in orientation of the gripping means is effected about the vertical axis and the gripping jaws are located in their desired locations and positions of orientation. In a preferred arrangement, one of the pairs of registration surfaces is provided upon a projection forming part of the article gripping means, the projection being receivable within a recess of the support, surfaces of the recess providing the other pair of registration surfaces.

In a particularly preferred arrangement of the device according to the invention, the article gripping means when in its lower position, is freely movable horizontally to move the gripping jaws away from the desired locations and positions of orientation and means is provided to move the article gripping means to return the jaws to their desired locations and positions of orientation. The article gripping means may be freely movable horizontally in an infinite number of directions to move the gripping jaws away from their desired locations and positions of orientation.

Each article gripping jaw is preferably L-shaped for engaging the article along two jaw surfaces. If the device is to be used for articles having one particular outside dimensional requirement, then the jaws may be nonpivotally mounted. However, for use with different articles having different outside dimensions, the jaws are advantageously pivotally mounted so as to orientate themselves automatically for engagement with the article so that all articles of a particular size and shape are held repeatedly by the device in a desired location and position of orientation. This location and position of orientation is different for articles of different sizes or shapes.

One embodiment of the invention will now be described, by way of example, with reference to the accompanying drawings, in which:

FIG. 8 is a cross-sectional view through part of the device taken along line VIII—VIII in FIG. 7;

FIG. 10 is a cross-sectional view through part of the device taken along line X—X in FIG. 6;

FIG. 11 is an elevational view of the device in the direction of arrow XI in FIG. 6;

Figure 1:
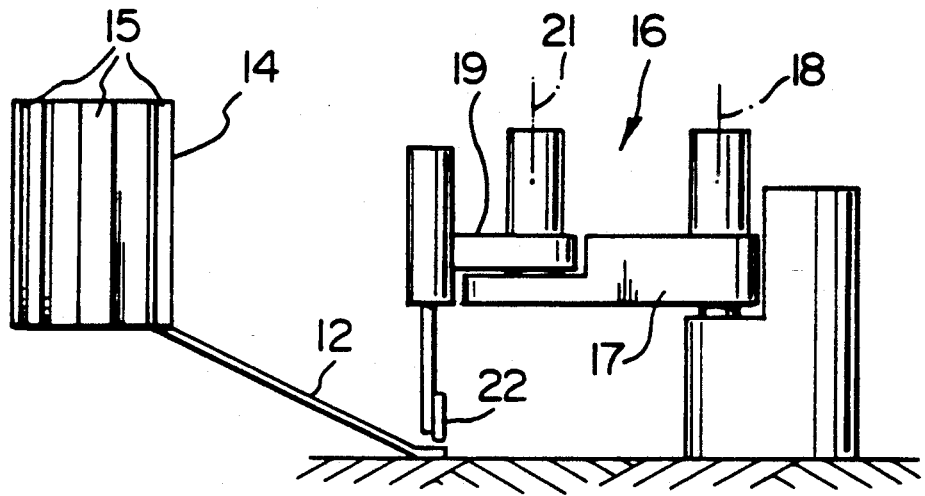
FIG. 1 is a diagrammatic side elevational view of a prior apparatus for transferring electronic components into a printed circuit board.
Figure 2:
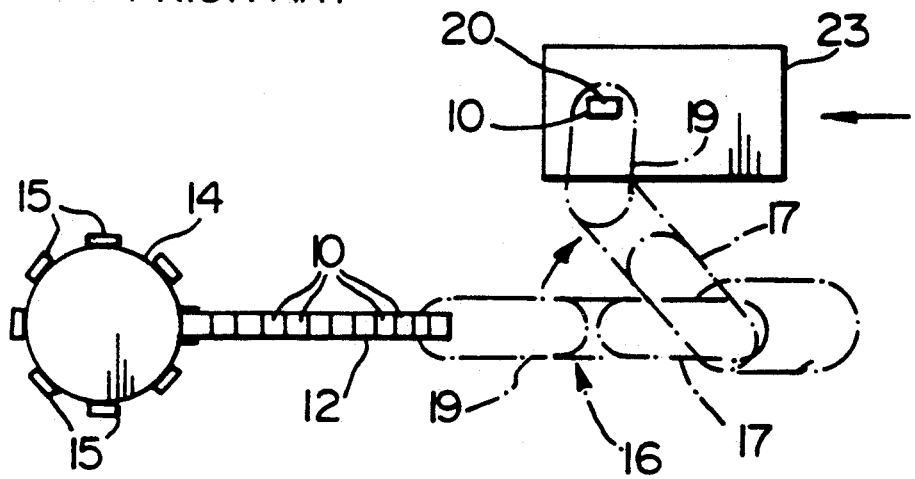
FIG. 2 is a plan view of the prior apparatus of FIG. 1.

In one prior method of transporting and assembling electronic components having terminal pins onto a printed circuit board, the electronic components 10 are fed in succession down a chute 12 as shown in FIGS. 1 and 2, from a rotatable tube feeder 14 having vertical stacks 15 of the components 10. An articulated robot arm 16 having a main arm section 17 pivotally mounted about a vertical axis 18 and another arm section 19, pivoted upon section 17 about vertical axis 21 is employed to transport each of the components 10 from the lower end of the chute 12 and position it accurately in an assembly station 20 on an individual printed circuit board 25 which is accurately located in position for this purpose. The boards are moved in succession along a conveyor (not shown) to receive their components 10. Alternatively, two or more components are fed in succession into different assembly stations on each board. Movement of the robot arm and of a gripper 22 for holding the components 10 at the free end of the arm is computer controlled. The gripper 22 is lowered over a pick-up station at the end of the chute 12 to grip a component 10 and transport it to a particular station 20 on the printed circuit board and then return to grip the succeeding component 10 which now lies in the pick-up station. As shown by FIG. 2, in which the robot arm 16, in its various positions, is indicated by a chain-dotted outline, the robot arm is indicated as moving between the pick-up station at the chute and an assembly station 20. The chute 12 is accurately designed so that upon reaching the lower end of the chute, i.e. at the pick-up station, each component is disposed accurately in a desired location and a position of orientation with regard to x and y coordinates in the computer memory so that as the gripper 22 grips the component 10, the component and gripper are precisely located relative to each other also in desired locations and positions of orientation. Hence, under computer control, the gripper may transport each component and accurately position it in its assembly station 20 upon its printed circuit board. When assembled, terminal pins of the components extend into terminal pin receiving holes in the board.

The above method of assembly of components 10 onto printed circuit boards is extremely effective. However, the initial cost for the chute 12 and the associated tube feeder 14 adds undesirably to the total cost of the apparatus. Also care must be taken to ensure that, on a continuous basis, each of the components 10 is disposed accurately in position with regard to the x and y coordinates when in the pick-up station. Otherwise problems arise in accurately locating the components 10 upon their printed circuit boards. Hence, maintenance and cleaning of the chute and tube feeder is a continual essential requirement to ensure that the total apparatus operates effectively. The time required for maintenance procedures is extremely inconvenient and reduces significantly the time available for commercial use of the apparatus.

Figure 3:
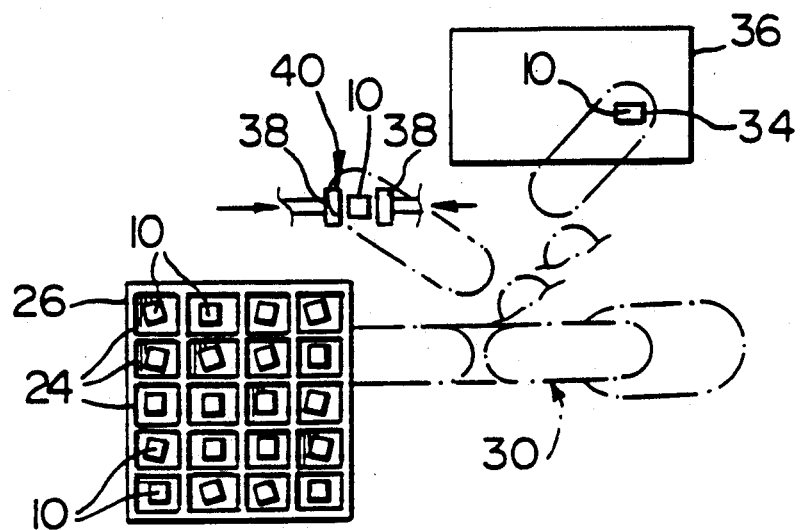
FIG. 3 is a diagrammatic plan view of another prior apparatus for transferring electronic components into a printed circuit board.

In a second known process as shown in FIG. 3, the use of the chute and associated tube feeder is avoided. In this process, components 10 are loaded individually into open topped compartments 24 formed in an inexpensive carrying tray 26 which may for instance be formed from molded foamed plastics material. A robot arm 30 (chain-dotted outline) having a gripper (not shown) is used for transporting the components sequentially from their pick-up stations (i.e. compartments 24) to their individual assembly stations 34 in a succession of printed circuit boards 36. In this particular process, the components 10 are not required to be accurately positioned with regard to the x and y coordinates of the computer as with the previously described method. In contrast, the components 10 are positioned loosely within the compartments 24 and may be slightly offset from desired locations and positions of orientation when being gripped and held by the gripper. Hence, each component 10 is not accurately disposed with regard to the gripper for positioning immediately in its particular assembly station 34 upon a printed circuit board 36. Thus, it is necessary for each of the components 10 to be correctly orientated and positioned after removal from the tray 26 and for this particular purpose, the robot arm moves to cause the gripper to deposit the component in spaced apart jaws 38 of a position setting device 40.

This operation complicates the arm and gripper movement in that for each component 10 the gripper is lowered to grip the component in the tray, the gripper then being raised prior to pivoting of the robot arm to enable the gripper to be lowered once more to deposit the component between the jaws 38 of the device 40. After the jaws 38 have been moved together to engage sides of the component and locate it and orientate it correctly with regard to the x and y coordinates within the computer, the gripper is again lowered to retrieve the component 10, is then raised and is moved by the robot arm to the assembly station 34 of the printed circuit board. Further to this, the device 40 is an inordinately expensive item and requires continual maintenance and cleaning to ensure that it operates correctly. As with the previously described prior method, this maintenance procedure detracts from the time available for commercial use of the whole apparatus.

The present invention as outlined below with regard to the embodiment to be described overcomes the problems associated with prior apparatus.

Figure 5:
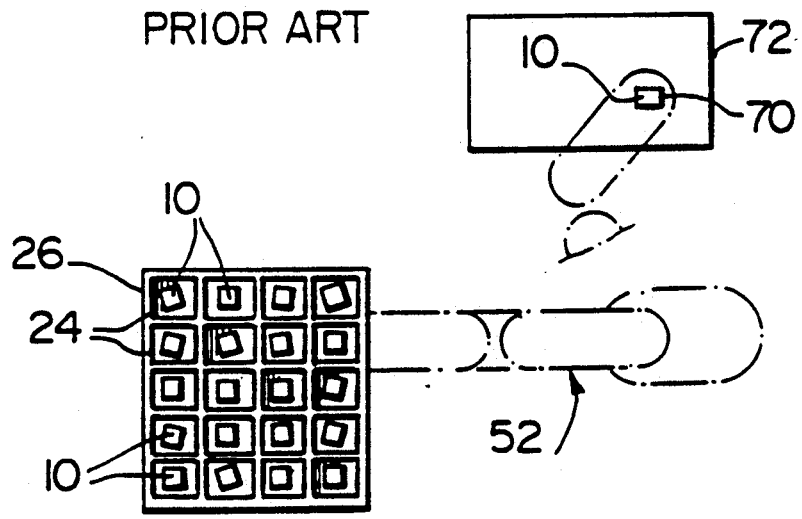
FIG. 5 is a plan view of the apparatus shown in FIG. 4, but to a smaller scale and incorporating the device of the embodiment.
Figure 4:
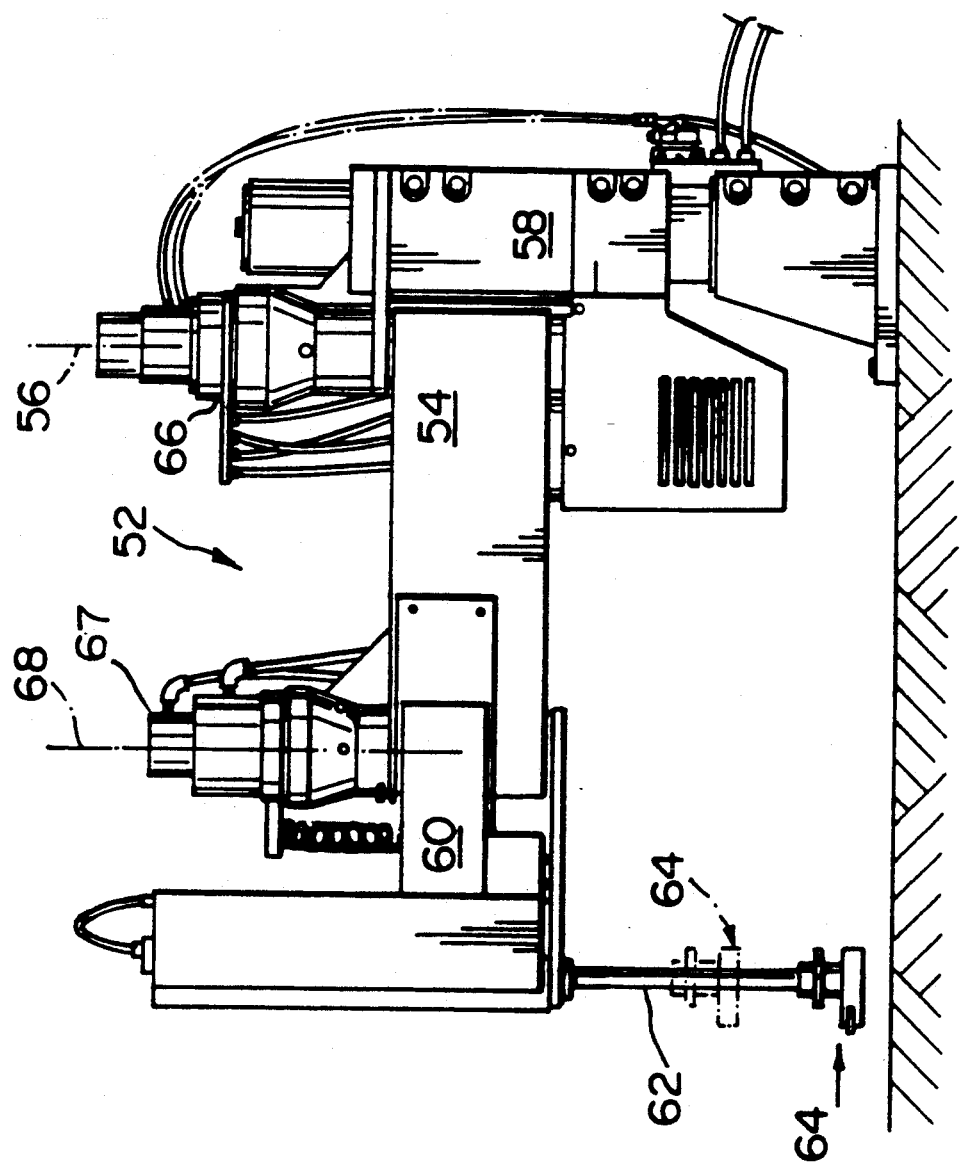
FIG. 4 is a side elevational view of an apparatus for transferring components into a printed circuit board, the apparatus including a device according to the embodiment.

FIG. 4 is a general side elevation of an apparatus according to the embodiment for transporting components 10 from pick-up stations and depositing them accurately upon a printed circuit board. As shown by FIG. 4, the apparatus comprises an articulated cantilever robot arm 52 of similar structure to that of robot arm 16 and comprising a main arm section 54 pivotally movable by motor 66 about a vertical axis 56 to a stand 58, and a further arm section 60 which is pivotally movable by motor 67 about axis 68 at a free end of the arm section 54. The arm section 60 has at its remote end a vertically movable vertical spindle 62, and a device in the form of a gripper 64 depends from a lower free end of the spindle 62. The gripper 64, as will be seen from the following description, is capable itself of locating each component 10 in a desired location and position of orientation and then of assembling it correctly onto a printed circuit board. As shown by FIG. 5, the gripper 64 is used for transporting components 10 substantially loosely contained within compartments 24 of a tray 26 similar to that in FIG. 3, and for locating each of them accurately in an assembly station 70 of an individual printed circuit board 72 without it being necessary for the device 64 to release the components for position and orientation correction prior to assembly onto a board. This is clear from a comparison of FIGS. 3 and 5.

Figure 6:
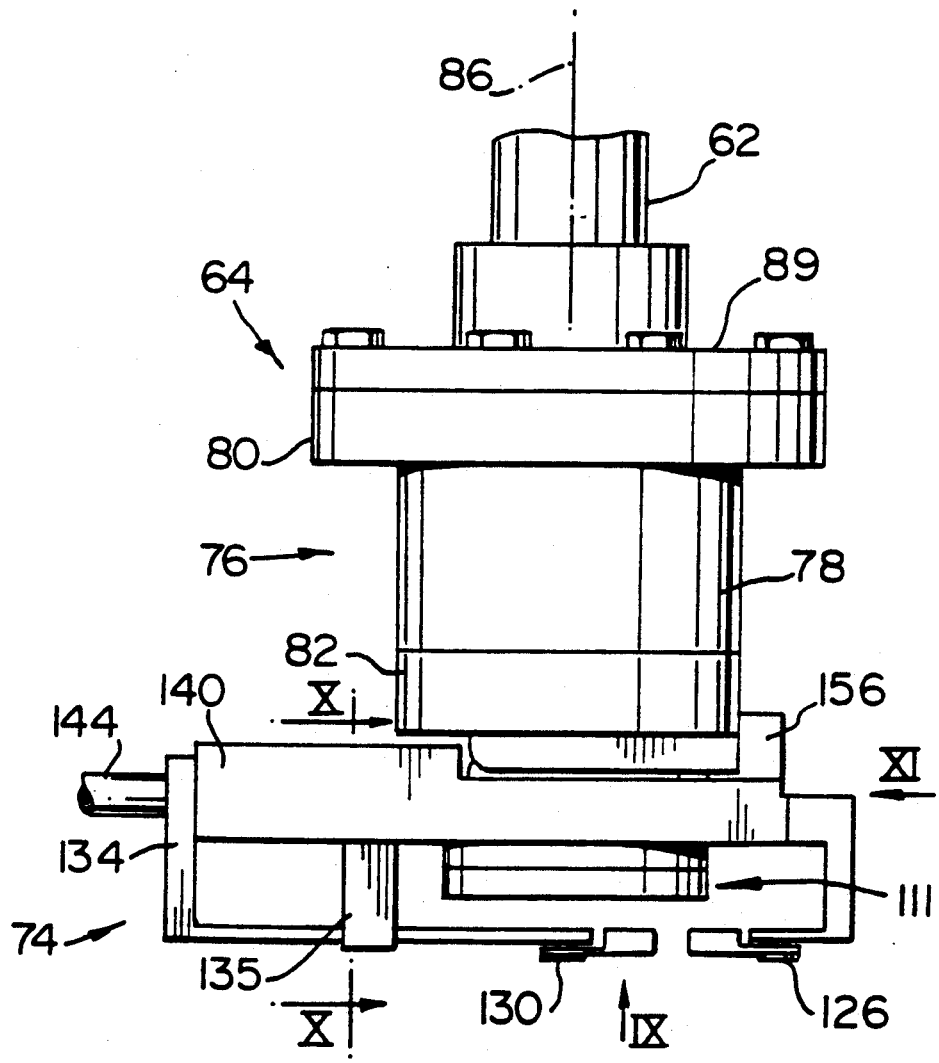
FIG. 6 is a side elevational view of the device of the embodiment and to a much larger scale than shown in FIG. 4.
Figure 7:
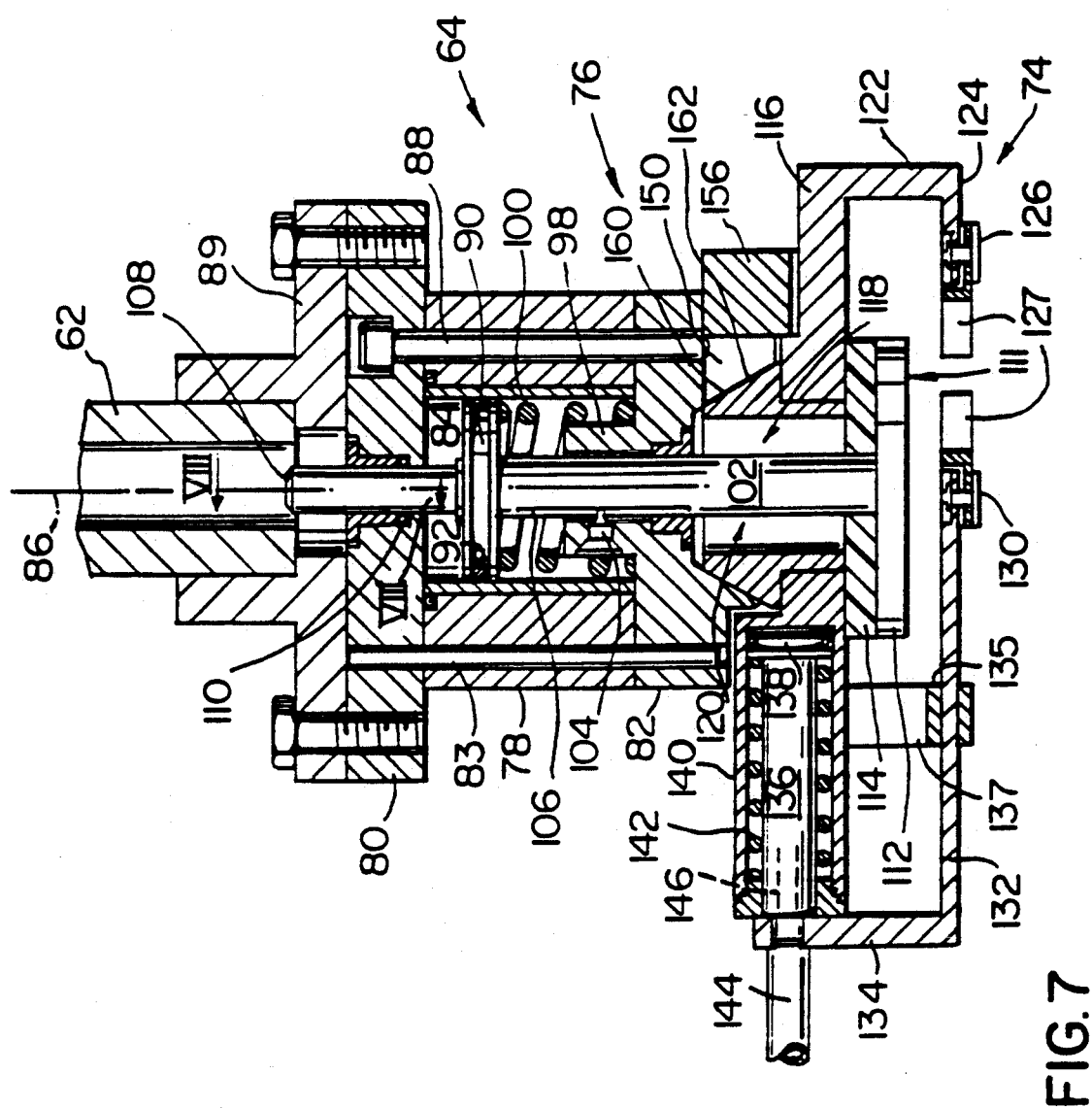
FIG. 7 is a cross-sectional view of the device in the same side elevation as in FIG. 6.

As shown by FIGS. 6 and 7 which are to a larger scale than FIG. 4, the gripper 64 comprises an article gripping means shown generally at 74 and a support carrying the article gripping means and shown generally at 76. The support 76 comprises a fluid operated (i.e. a pneumatically operated) piston and cylinder assembly comprising a cylinder formed by a centrally disposed cylindrical section 78, an upper end 80 and a lower end 82, the two ends and the cylindrical section 78 being assembled together to define the chamber 84 of the cylinder. Cylindrical section 78 and the two ends 80 and 82 are held in relative positions by vertical registration pins 83 spaced apart around the vertical axis 86 of the cylinder, the cylinder parts being held together by bolts 88 also spaced apart around the axis. The device 64 is held assembled to the spindle 62 by an end fitting 89 which is detachably secured to the lower end of the spindle by means not shown.

Figure 12:
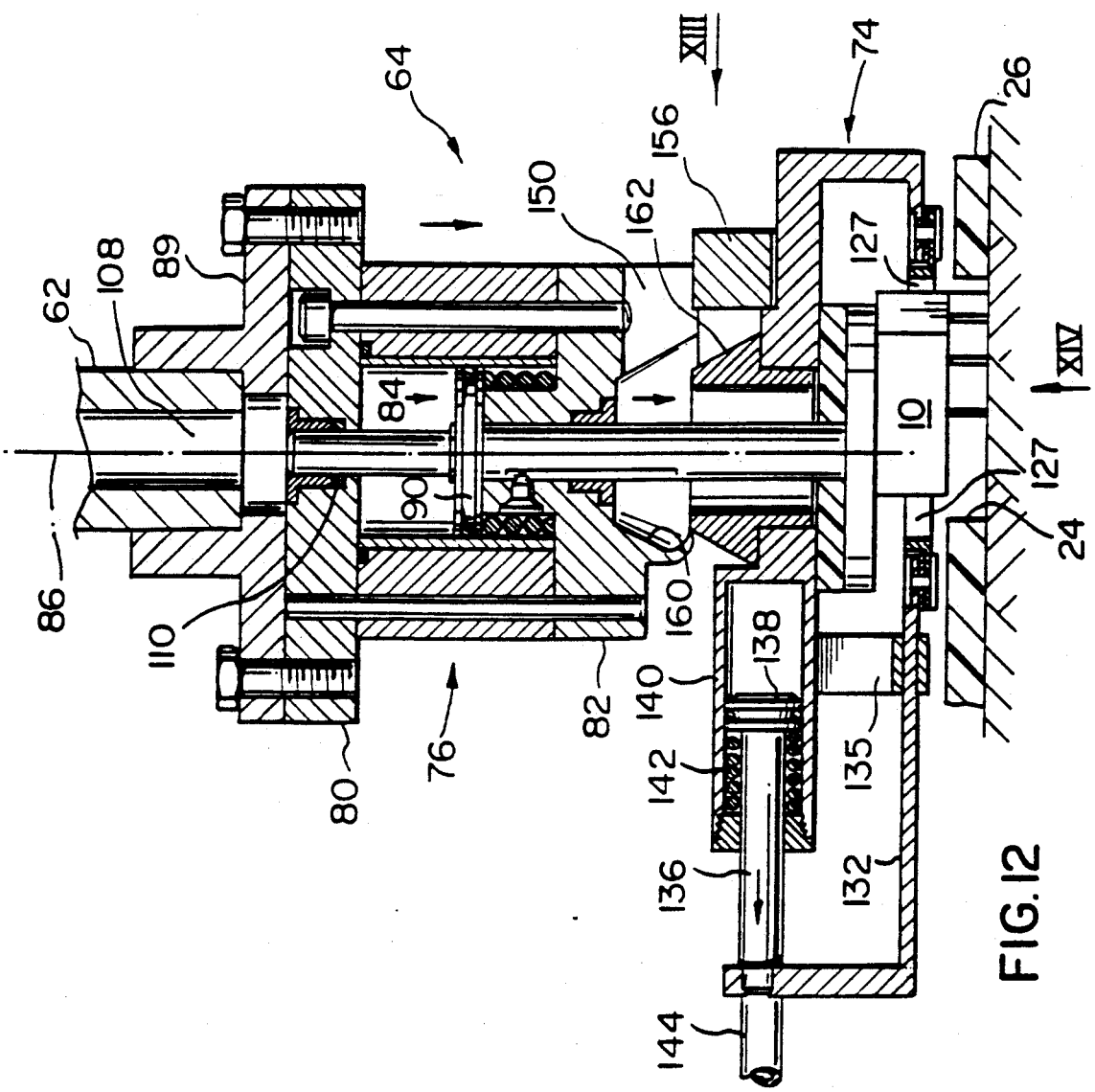
FIG. 12 is a view similar to FIG. 7 showing the device during an initial stage in its operation.

Piston 90 within the cylinder is provided with an O-ring seal 92 for sealing contact with the peripheral wall of the chamber 84. The piston and cylinder assembly is pneumatically controlled through an inlet tube 94 (FIG. 8) which communicates with the top of the cylinder 84 through passageways 96 provided in the upper end 80 of the cylinder, the air pressure forcing the piston in a downward direction until it reaches a stop provided by the upper surface of a central boss 98 extending upwardly into the chamber 84 as an extension of the lower end 82. The lower cylinder position is shown in FIG. 12. Normally however the piston 90 is disposed in an upper position as shown in FIG. 7, into which it is urged by a return compression spring 100 which extends downwardly from the piston and surrounds the boss 98. A downward extension of the piston is provided by a piston rod 102 which is slidably received within the boss 98. A key 104 extends through the boss to be received in channel 106 of the piston rod so as to prevent rotation of the rod and the piston around the axis 86. For alignment purposes, an upward extension of the piston, in the form of a short piston rod 108, is slidably received through the upper end 80 of the cylinder, the piston rod 108 being sealed to the upper end by a resilient O-ring 110.

At the lower end of the piston rod 102 there is provided a carrier for the article gripping means, the carrier being provided by horizontal platform 111. The platform 111 comprises a lower metal plate 112, secured directly to the piston rod, and an upper plate 114 secured to the lower plate, the upper plate being formed from a friction resistant material i.e. polytetrafluoroethylene which may be Teflon TM. The article gripping means 74 comprises a substantially planar horizontal plate member 116 which is supported upon the plate 114 to be slidable thereon with low frictional resistance. The plate member 116 surrounds the piston rod 102 and, the plate member 116 is provided with a large opening through which the piston rod 102 extends, this opening accommodating a substantially cylindrical member 118 carried by the plate member 116. The cylindrical member 118 surrounds the piston rod 102 which extends through a clearance hole 120 of cylindrical member 118. This clearance hole is sufficiently large to enable the article gripping means 74 to move horizontally relative to the piston rod 102 as required and for reasons to be discussed below.

Figure 9:
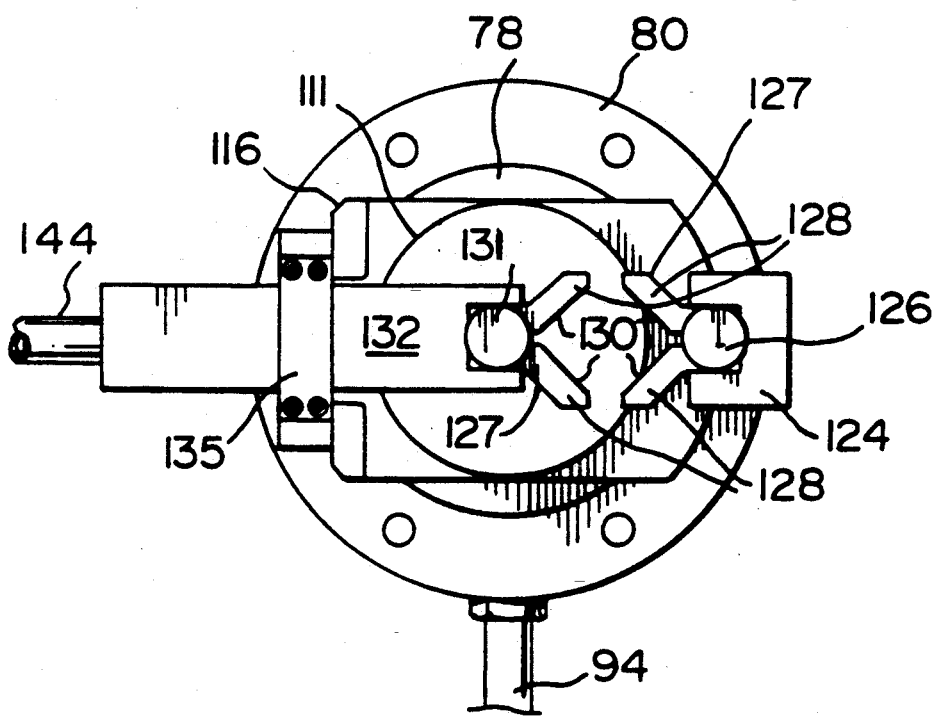
FIG. 9 is a view of the device in the direction of arrow IX in FIG. 6.

At one side as shown by FIG. 7, the plate member 116 has a downwardly extending arm 122 which terminates in an inwardly extending jaw mount 124 beneath the plate 112, the jaw mount 124 having pivotally mounted thereon by pin 126, a gripping jaw 127. The gripping jaw 127 is in the form of an L-shape (FIG. 9) and has two limbs 128 providing surfaces 130 for engaging adjacent sides of a component 10, the surfaces 130 being normal to each other in a horizontal plane. Opposed to this jaw 127 is another and similar jaw 127 with limbs 128 mounted by a pivot pin 131 upon another jaw mount 132. The mount 132 extends away from the mount 124 and then upwardly as an arm 134. The jaw mount 132 is substantially longer than the jaw mount 124 and to maintain its horizontal position with the jaws 127 opposed, the jaw mount 132 is slidably received within a support 135 which has an opening 137 for receiving the platform 111 (FIGS. 7 and 10). At the upper end, the arm 134 is secured to a piston rod 136 of a piston 138 which is movable horizontally within a cylinder 140 integral with the plate member 116 of the article gripping means 74. The piston 138 is normally urged towards the right-hand end of the cylinder 140 by a compression spring 142. To move the piston towards the left thereby moving the jaw mount 132 beneath the platform 111, compressed air is introduced through an inlet tube 144, axially along the piston rod 136 through a coaxial passage 146 and from an outlet at the end of the piston 138.

Figure 13:
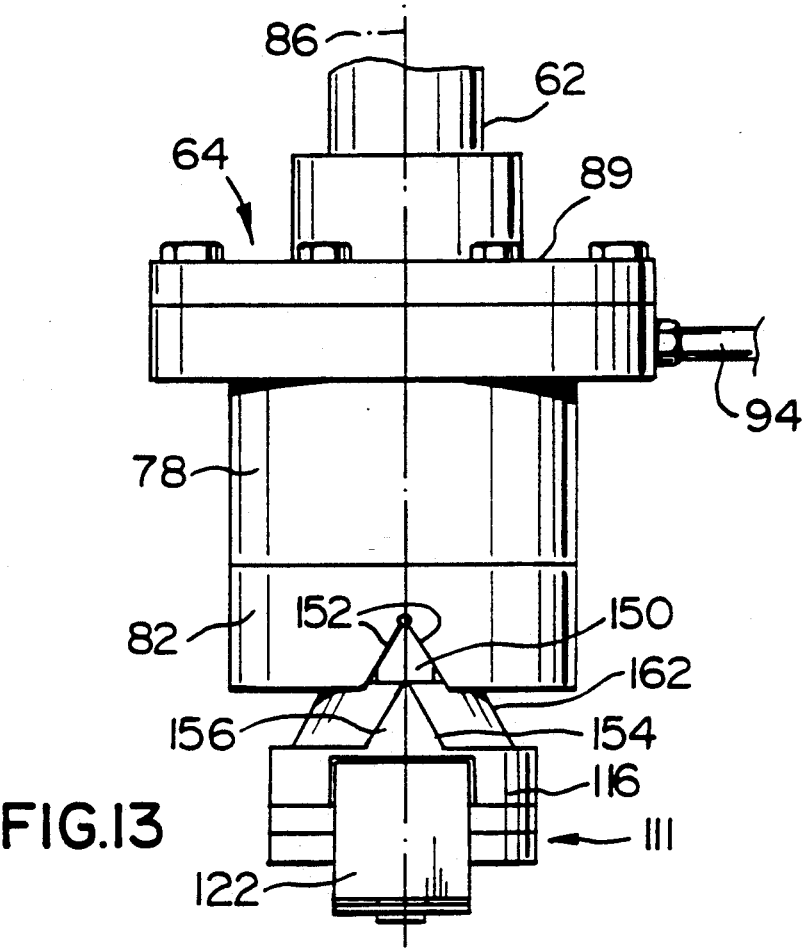
FIG. 13 is an elevational view in the direction of arrow XIII in FIG. 12 showing the device in its initial stage of operation.

The article gripping means 74 is thus movable in a vertical direction upon the platform 111. As will become apparent below, with the piston 90 in its upper position of FIG. 7, the article gripping means 74 is immovable upon the horizontal platform 11. However, in the lower position of the cylinder 90 (FIG. 12), the article gripping means 74 is spaced away from the lower end 82 of cylinder 76 and is free to change its angle of orientation around the vertical axis 86 of the cylinder 76. As described below, this freedom of movement is to enable the jaws 127 to grip upon a component 10 which is misaligned with regard to its desired horizontal x and y coordinate positions within the computer. To enable the component 10 to become aligned, orientation correction means are provided to effect change in the angular orientation of the gripping means relative to the axis 86 after the gripping means has moved out of its lower position (FIG. 12). The orientation correction means comprises a pair of opposed and converging registration surfaces upon the support and a further pair of converging registration surfaces provided upon the article gripping means. In this embodiment, one pair of the opposed converging surfaces is provided by opposed surfaces 152 (see for instance FIGS. 2, 11 and 13) of an upwardly tapered recess 150 formed in radially outer regions of a downward extension of the cylinder 76 as provided by the lower end 82. The other pair of registration surfaces 154 are provided at opposite sides of a tapered projection 156 which extends upwardly in one location from the plate member 116 of the article gripping means. With the article gripping means 74 in its upper position as shown by FIG. 7, the projection 156 lies with the surfaces 154 in intimate contact with the surfaces 152.

Figure 15:
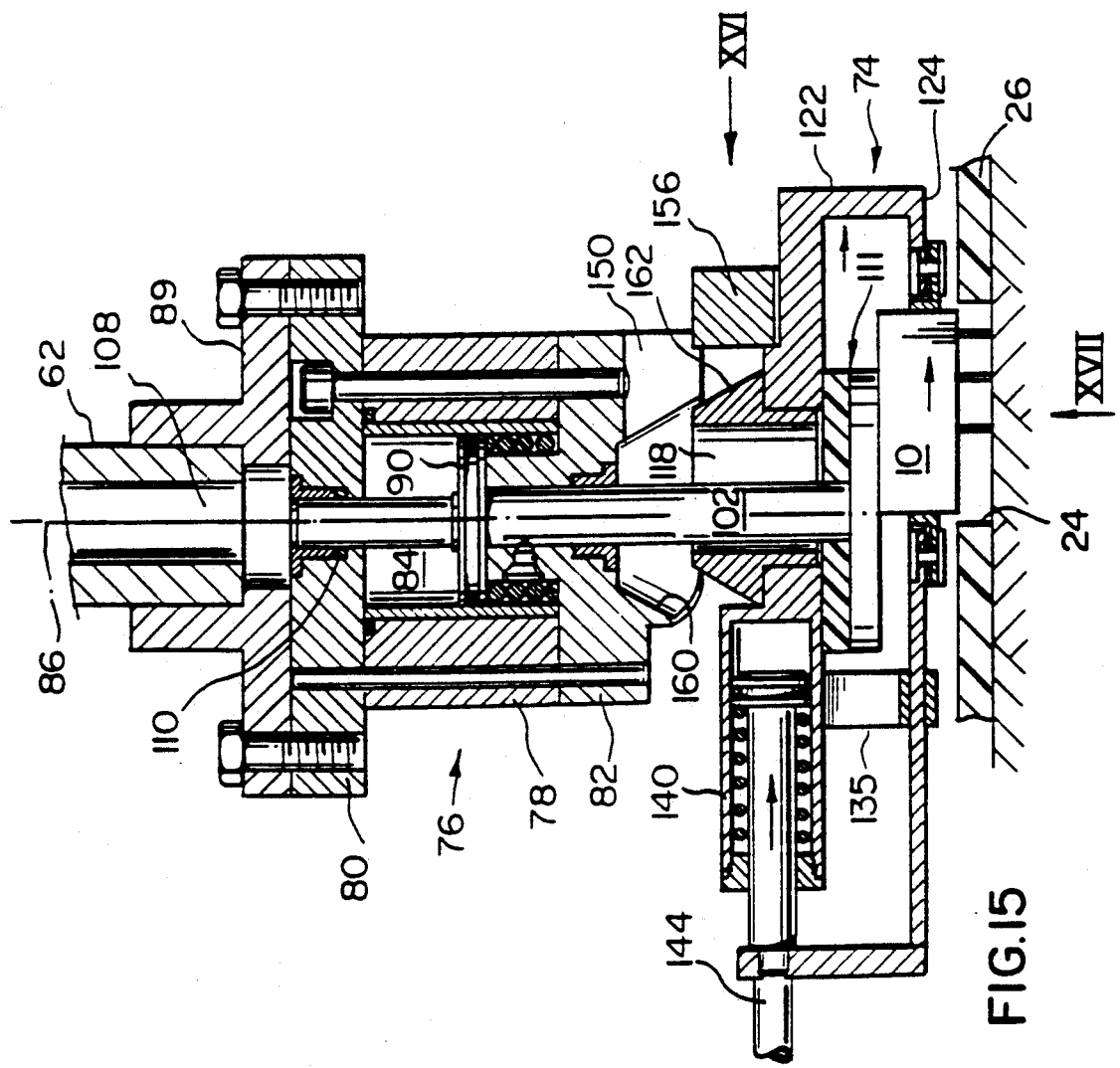
FIG. 15 is a view similar to FIG. 7 and showing the device during a second stage in its operation.

In addition to the article gripping means 74 being changeable in its angle of orientation around the axis 86, in its lower position it is also movable horizontally in an infinite number of directions so that, in any displaced horizontal position of the article gripping means 74, the cylindrical member 118 lies eccentrically with regard to the axis 86 of the cylinder 76, for instance as shown by FIG. 15. As explained below, such a movement takes place when a component 10 to be gripped by the jaws 127 is displaced from its desired location relative to the device 64. To correct this horizontal movement of the gripping means 74 during return of the article gripping means into its upper position, the device 64 is provided with a means to move the article gripping means so as to return the jaws to desired locations relative to the axis 86. This means for returning the jaws to their desired locations comprises at least one arcuate surface on the article gripping means itself and which coacts with an arcuate surface on the cylinder 76 as the article gripping means moves into its upper position. As shown by FIGS. 7 and 12, the one arcuate surface is provided by a frusto-conical surface 160 extending upwardly into the end fitting 82, the surface 160 being coaxial with regard to the axis 86. The surface 160 is discontinuous around one angular section of the end fitting 82 because of the recess 150 extending radially from the outer extremes of the fitting 82 and opening at the surface 160. The other arcuate surface is provided by a frusto-conical surface 162 formed around an upper end region of the cylindrical member 118, the surface 162 being complementary to the surface 160. As may be seen from FIG. 7, with the article gripping means 74 in its upper position the surfaces 160 and 162 lie in intimate engagement.

Instead of both surfaces being frusto-conical, each surface may be arcuate also in any section normal to a tangent to the surface. Hence, in one modification, each surface 160 and 162 may follow the shape of the surface of a sphere.

In use, and as already indicated with reference to FIG. 5, the arm, under computer control, is movable in a relatively simple manner to remove the components 10 in sequence from their compartments 24 in the tray 26 and deposit them directly by a single swinging movement of the robot arm into their individual assembly stations 70 in a succession of printed circuit boards 72. This is notwithstanding that any or each of the components 10 may be displaced from its desired x and y coordinates and may also be angularly displaced from its desired position of orientation by up to an angle of 20°. Thus, as will be seen, the device 64 of this embodiment is capable of correcting the position of each component 10 where there is a error of up to 20° in the angle of orientation. In any particular case the limiting angle for positional error of a component 10 which may be corrected is dependent upon the actual design of a particular embodiment of the invention and it should be understood that the invention is not limited to the quoted angle of 20°.

Figure 14:
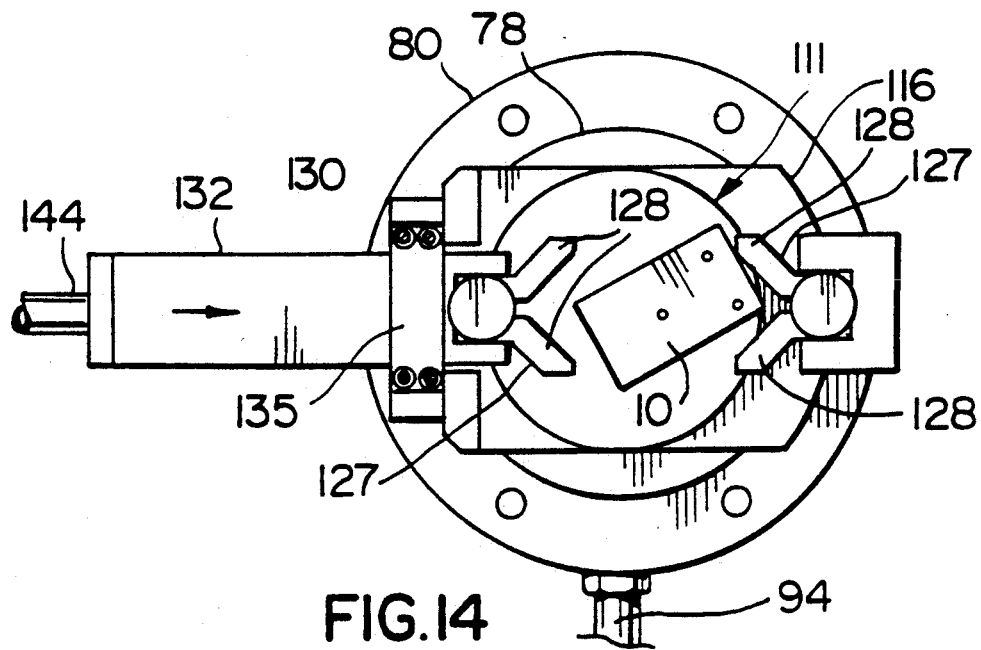
FIG. 14 is a view on the underside of the device taken in the direction of arrow XIV in FIG. 12 and showing the device during the initial stage of operation.
Figure 19:
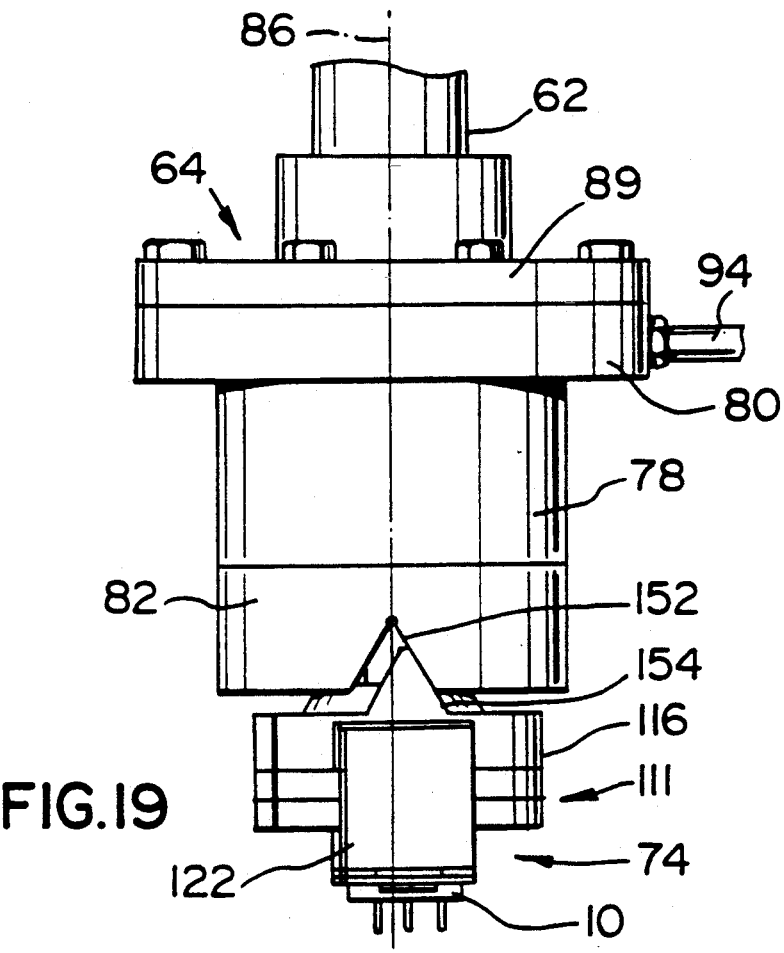
FIG. 19 is an elevational view of the device in the direction of arrow XIX in FIG. 18.

Initially, for moving a surface mount component 10 to its assembly station, the gripper 64 is in an upper position, shown by chain-dotted outlines in FIG. 4, by movement of the spindle 62 in an upper direction in the arm section 60. With the gripper 64 in its upper position it is disposed correctly by arm movement over the selected pick-up station of the tray 26. The spindle is then moved downwardly to move the gripper 64 towards the tray and, in addition, pressurized air is introduced into the top of the chamber 84 through the inlet tube 94 (FIG. 8) so that the piston 90 is urged downwardly against the spring 100. This movement continues until the piston 90 engages against the upper surface of the boss 98 as shown by FIG. 12. Also initially, the jaws 127 are in their closest positions together as shown by FIGS. 7 and 19 because of the position of piston 138. However before reaching the lowest position of the piston 90, compressed air is introduced into the cylinder 140 to urge the piston 138 towards the left as shown in FIG. 12 so as to draw the left-hand jaw 127 away from the right-hand jaw. With the jaws in this position apart, the article gripping means 74 descends so as to locate the two jaws 127 on opposite sides of the selected component 10 (FIG. 14). At this stage, the projection 156 has been moved away from recess 150 (FIG. 13) and the surface 162 is moved away from the surface 160 (FIGS. 12 and 13) so that there is no control either in the horizontal positioning or in the position of orientation of the article gripping means relative to the vertical axis 86.

Figure 16:
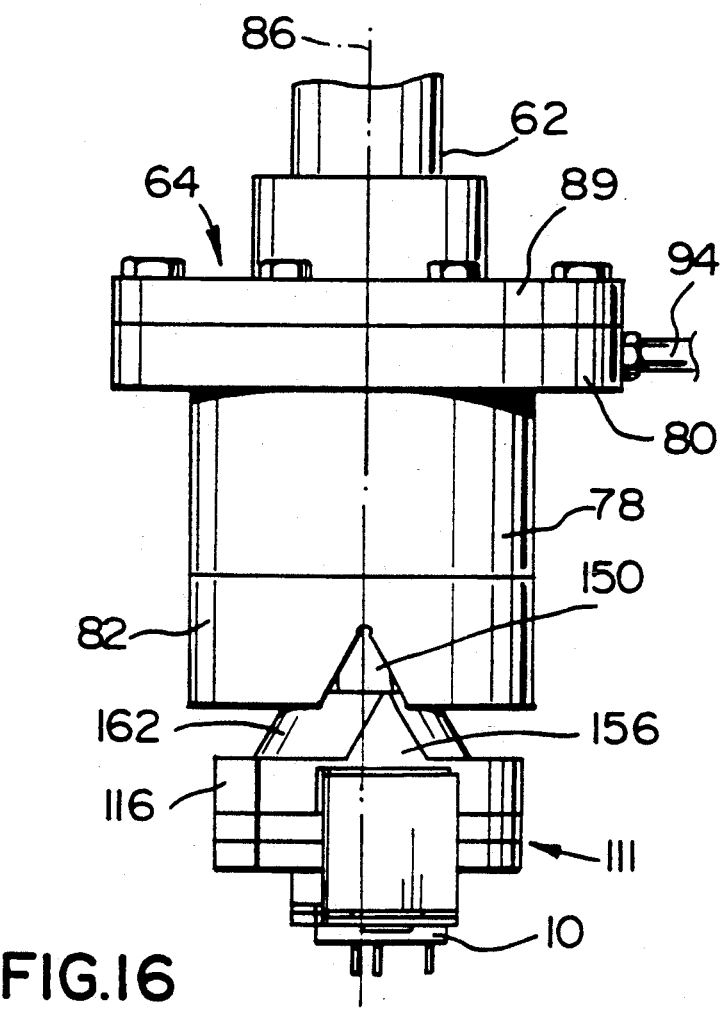
FIG. 16 is an elevational view of the device in the direction of arrow XVI in FIG. 15 and showing the device during its second stage of operation.
Figure 17:
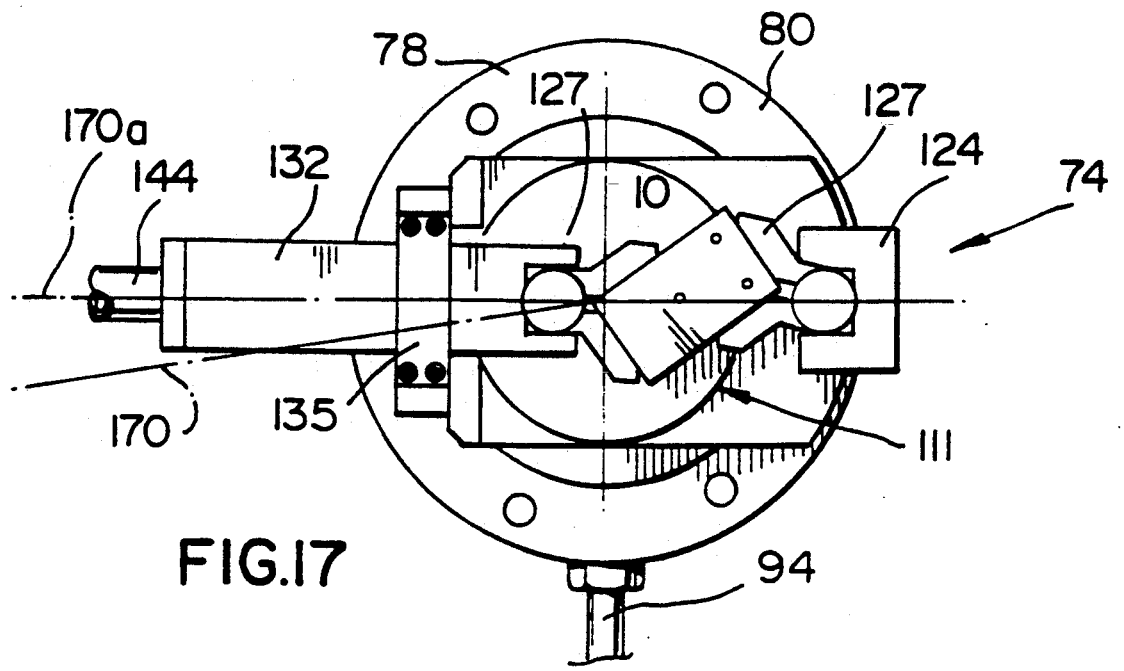
FIG. 17 is a view on the underside of the device during its second stage of operation and taken in the direction of arrow XVII in FIG. 15.

Initially, the component is not in its desired location and position of orientation relative to the axis 86. To grip the component 10 between the jaws, air is then excavated from the chamber 140 through the tube 144 so that the piston 138 is urged towards the right of the cylinder 140 by the spring 142. This causes the left-hand jaw in FIGS. 7 and 12 to move towards the right and towards the component 10. Upon engagement with the component 10 by the left-hand jaw 127, the jaw then pushes the component towards the right-hand jaw 127. As there may be some resistance to horizontal movement of the component 10, it may be found that the right-hand jaw is caused to move towards the component 10 under the action of the spring 142 and by movement of the plate member 116 horizontally until the component 10 is gripped between the pairs of jaws 127. In the case of this particular component 10 in side elevation, the final position with the jaws gripping the component is as shown by FIG. 15 in which both the component and the article gripping means have moved towards the right as compared with FIG. 12. This may easily be seen by comparing the position of both the cylindrical member 118 and the component 10 in both figures with regard to the vertical axis 86. The horizontal displacement of the article gripping means 74 will of course vary from one component 10 to another and while the particular displacement being described in this embodiment lies in the plane of FIG. 15, it should be understood that the horizontal displacement may occur in other directions at angles to that particular plane. In addition, as can be seen from FIG. 14, because the component 10 is not in its correct position of orientation, it is not symmetrically positioned between the jaws before being gripped by them. As a result, one of the limbs 128 of each jaw 127 lies closer to the component 10 than the other as the left-hand jaw commences to move towards the component. Upon engagement of each of these two closer limbs 128 with the component 10, there is a pivoting action about the pins 126 and 131 of both of the jaws which automatically takes place as the jaws continue to move towards each other so as to accommodate the component 10 between the jaws with two adjacent sides of the component held against surfaces 130 of each jaw. This is as shown by FIG. 17 in which the pivotal movement of the jaws 127 around the axes of the pins 126 may be clearly seen. In addition, the jaws upon closing around the component 10 find resistance to rotation of the component 10 to align it with the axis 170. As a result, the article gripping means 74 is caused to rotate slightly upon the platform 111 as the jaws close. Thus a common axis extending through the axes of pins 126 and 130 moves from its original position 170 in FIG. 17 to the position shown at 170a in that figure. Hence, upon gripping the component 10 between the jaws 127, the article gripping means 74 is displaced both horizontally and angularly about the axis 86 to a position which is not computer controlled. In side elevation (FIG. 16) the projection 156 is no longer aligned with recess 150 because of the rotational movement of the gripping means 74.

Figure 18:
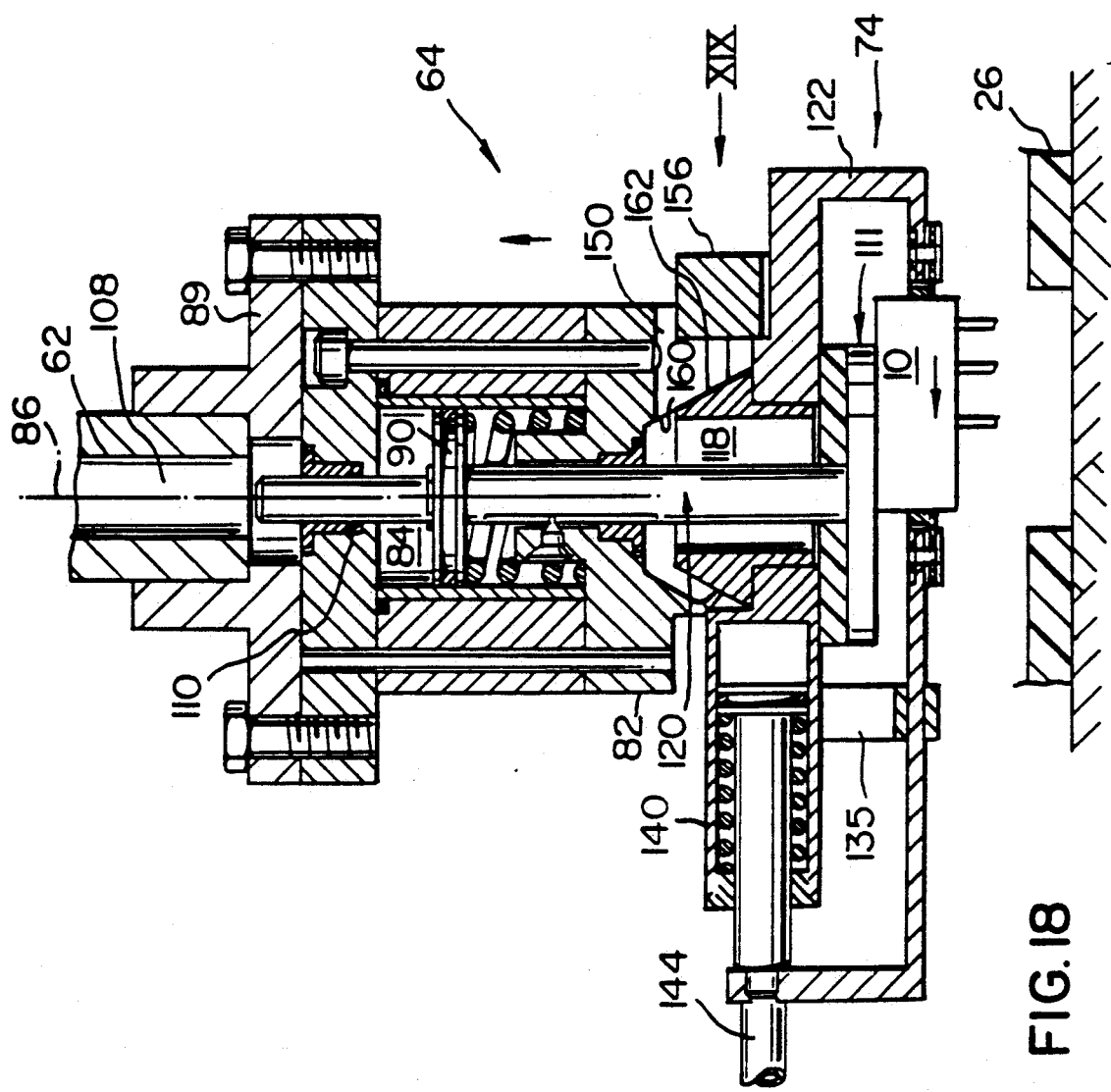
FIG. 18 is a view of the device similar to FIG. 7 and showing the device during a third stage of its operation.
Figure 20:
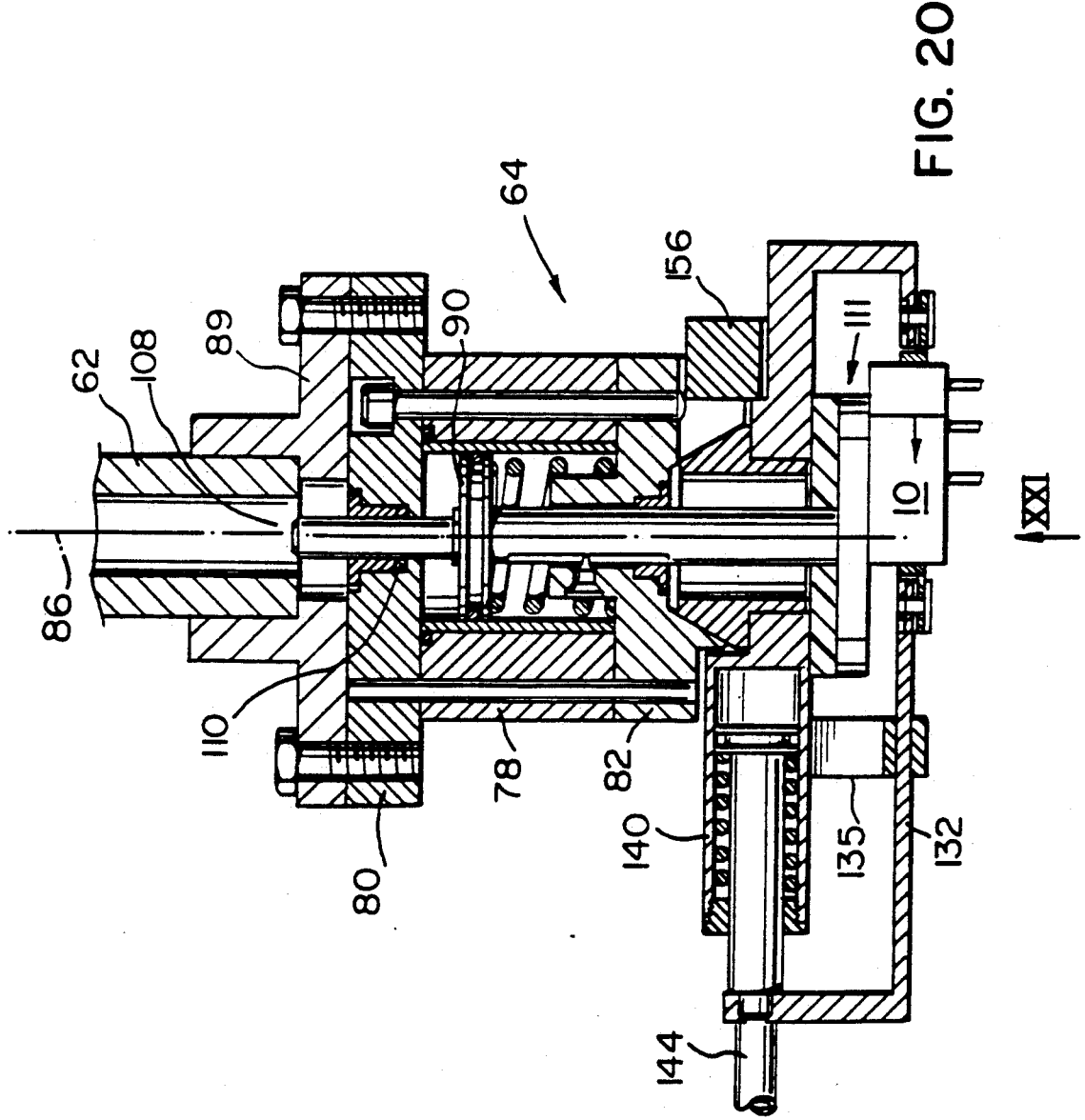
FIG. 20 is a view similar to FIG. 7 and showing the device at a fourth stage in its operation.

The above situation is corrected upon release of air from the chamber 84. The spring 100 then returns the piston 90, the platform 111 and the article gripping means 74 more upwardly to bring the article gripping means into the upper position shown by FIGS. 7 and 20. As the article gripping means 74 is raised into its upper position, the angular orientation correction means and the means to return the jaws to their desired locations relative to the cylinder, both become effective to move the surface mount component 10 into its desired location and position of orientation relative to the axis 86 of the cylinder so that it is correctly disposed for location in the assembly station in the printed circuit board. Movement in the horizontal direction into the correct location occurs during upward movement of the article gripping means 74 when the frusto-conical surface 162 on the cylindrical member 118 first contacts and then slides upwardly in contact with the frusto-conical surface 160 of the lower end 82 of the cylinder. This can be seen by a comparison of FIGS. 15 and 18. In FIG. 18, the cylindrical member 118 and thus the remainder of the article gripping means 74 has commenced to move towards the left in that figure because of the sliding engagement of the two frusto-conical surfaces and this movement continues until the upper position is reached as shown by FIG. 20. In this position, the two frusto-conical surfaces engage intimately completely around the axis 86. In correcting the angular orientation of the jaws and thus of the component 10, as the article gripping means 74 moves upwards under the influence of the spring 100, the projection 156 enters into the recess and the right-hand inclined surface 154 engages the right-hand inclined surface 152 (FIG. 19). Thus, as upward movement continues the article gripping means is urged in a rotational direction around axis 86 by virtue of the action of the inclined surfaces 152 and 154 until in the upper position, the projection 156 rests intimately within the recess 150 as shown by FIG. 11.

Figure 21:
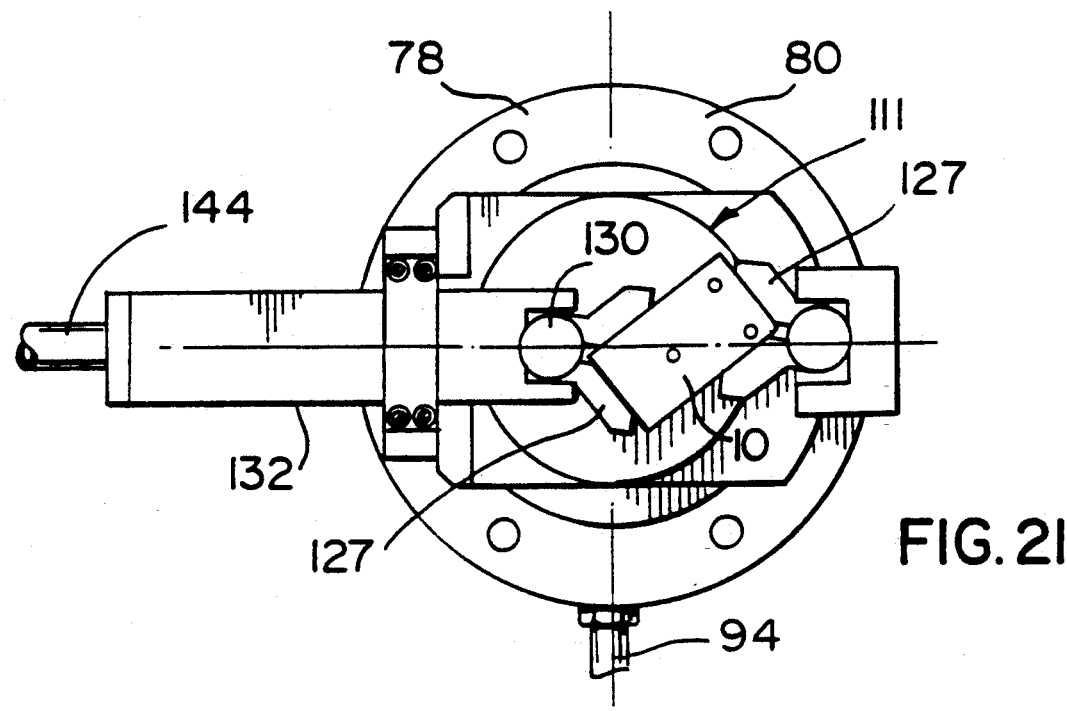
FIG. 21 is a view on the underside of the device at its fourth stage of operation and in the direction of arrow XXI in FIG. 20.
Figure 22:
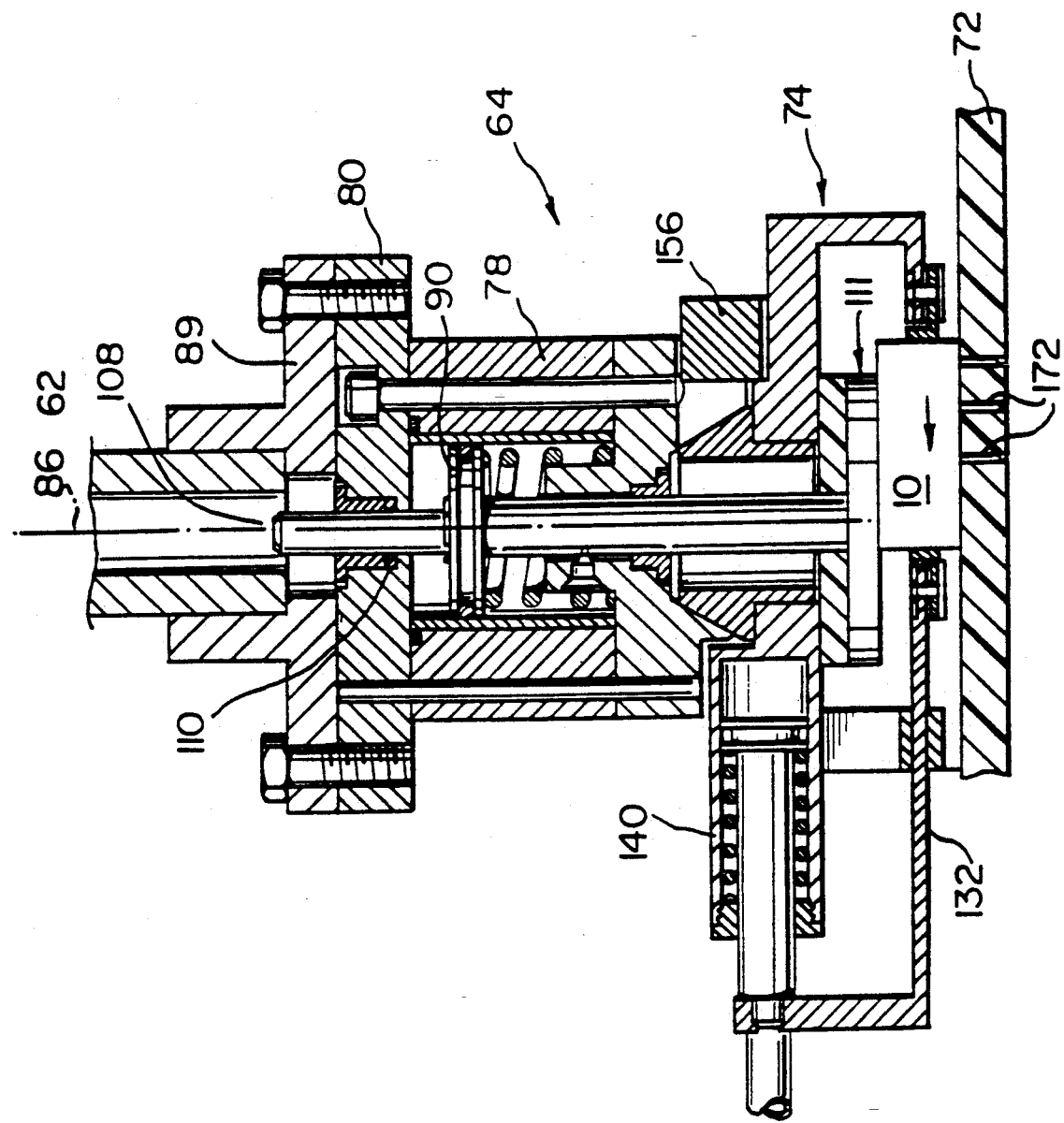
FIG. 22 is a view similar to FIG. 7 and showing the device at a fifth stage in its operation.

When the article gripping means 74 is in its upper position, the surface mount component 10 is oriented between the gripping jaws in the position shown by FIG. 21. As may be seen from a comparison between FIGS. 17 and 21, the common axis between the pins 126 has again assumed its original position 170. The gripping jaws in this position do not assume their symmetrical locations relative to the axis 170 but are necessarily turned about their pivot pins so as to grip the component 10 (FIG. 21). The final positions of the jaws 127 are dictated by the size and shape of the actual component. However, with the article gripping means 74 in the upper position, the desired location and position of orientation of the component 10 are as desired with regard to the x and y coordinates within the computer memory. To assemble the component 10 into its assembly station on the printed circuit board, it is merely necessary to have one computer controlled movement of the arm 52 from the tray 26 to the board 72. Downward movement of the spindle 62 with the article gripping means 74 in the upper position will then accurately locate the component 10 upon the board 72 (FIG. 22) with terminal pins 172 of the component received within holes in the board.

As may be seen from the above embodiment, the present invention avoids the necessity of requiring devices, separate from the robot arm 52 and gripper, for orienting and positioning the components 10. Thus, maintenance and repair of such devices is avoided. In the present invention, and as shown by the above described embodiment, the positioning means and the angle orientation connection means are employed advantageously in the transporting head itself so as to simplify the total operation.

Figure 23:
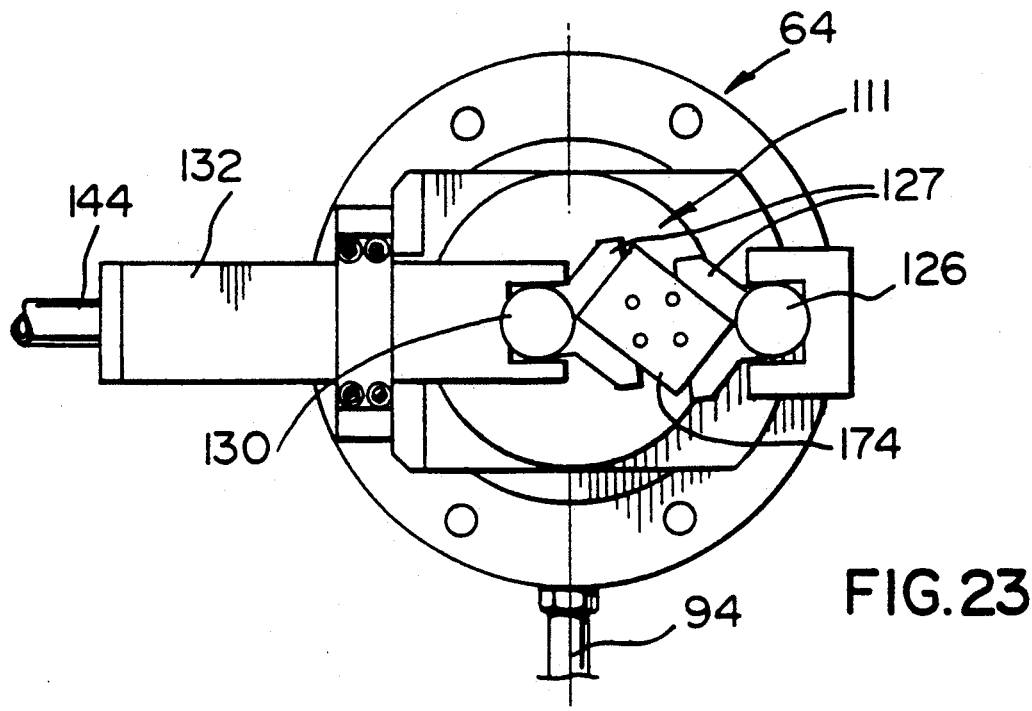
FIG. 23 is a view similar to FIG. 21 but showing different positions of the parts of the device at the fourth stage of operation and when associated with a different electronic component.
Figure 24:
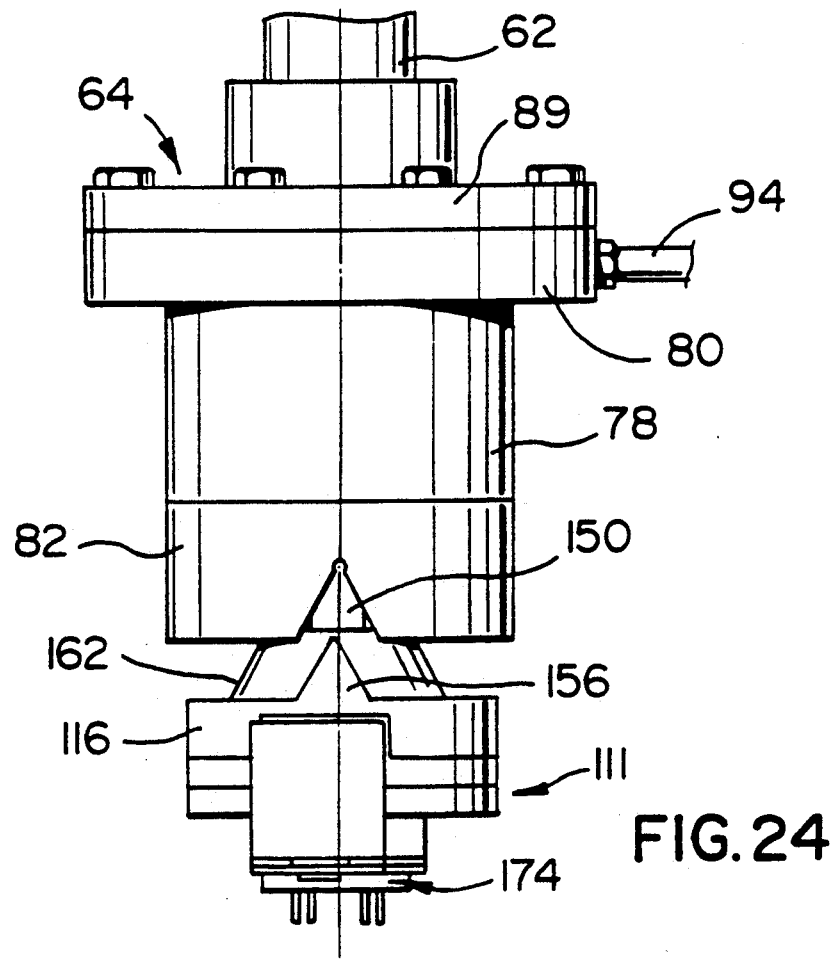
FIG. 24 is a view similar to FIG. 16 and showing an alternative movement of parts of the device during the second stage of operation.

The gripper may be used to assemble components of different sizes and shapes in assembly stations upon a printed circuit board. In these cases, the jaws 127 will automatically assume different angles of orientation about the axes of their pivot pins 126 and 131 so as to accommodate the different shaped components. For the shape and size of any particular component, the computer is programmed so as to move the robot arm and the gripper to position that component in its assembly station. As an illustration of the use of the gripper 64 for different sizes and shapes of components, attention is drawn to FIG. 23 wherein it may be seen that a component 174 is of different design from that described with regard to the first embodiment. With regard to FIG. 23, the jaws 127 are positioned differently for accommodating the component 174 between them. In addition, because the component 174 is oriented differently, then in its lower position, the article gripping means 74 has rotated to a different position, i.e. as shown in FIG. 24, from that shown in the embodiment and illustrated in FIG. 16. Thus, during raising of the article gripping means, the left-hand surfaces 152 and 154 engage each other to rotate the article gripping means 74 back to its desired location when in its upper position.

What is claimed is:

1. A device for use in positioning an article precisely in a desired location and position of orientation comprising:

an article gripping means and a support carrying the article gripping means;

the article gripping means having at least two relatively movable gripping jaws and being movable between an upper position close to the support and a lower position spaced from the support and in which the article gripping means is freely angularly orientable horizontally around a vertical axis of the support to enable the jaws during closing to engage, become correctly positioned relative to, and then grip the article before raising it;

and angle orientation correction means for effecting change in the angle of horizontal orientation of the gripping means around the vertical axis after the gripping means has been moved out of the lower position whereby, with the gripping means returned to the upper position, the gripping jaws when gripping the article are disposed in desired positions of horizontal orientation relative to the vertical axis, the angle orientation correction means comprising a pair of registration surfaces provided upon the support and another pair of registration surfaces provided upon the article gripping means, the registration surfaces of at least one pair converging and being inclined relative to the vertical axis with a registration surface of one pair slidable upon a corresponding surface of the other pair as the article gripping means is being moved into the upper position to effect change in horizontal orientation of the gripping means around the vertical axis and dispose the gripping jaws in their desired positions of horizontal orientation.

2. A device for use in positioning an article precisely in a desired location and position of orientation comprising:

an article gripping means and a support carrying the article gripping means;

the article gripping means having at least two relatively movable gripping jaws and being movable between an upper position close to the support and a lower position spaced from the support and in which the article gripping means is freely angularly orientable horizontally around a vertical axis of the support to enable the jaws during closing to engage, become correctly positioned relative to, and then grip the article before raising it;

and angle orientation correction means for effecting change in the angle of horizontal orientation of the gripping means around the vertical axis after the gripping means has been moved out of the lower position whereby, with the gripping means returned to the upper position, the gripping jaws when gripping the article are disposed in desired positions of horizontal orientation relative to the vertical axis, the angle orientation correction means comprising a projection provided upon one of the article gripping means ad the support and a recess formed upon the other of the article gripping means and the support, the projection having registration surfaces which converge in an upward direction, the projection moving into the recess with one of the registration surfaces of the projection engaging and sliding upon a corresponding registration surface of the recess as the article gripping means is being moved into the upper position to effect change in horizontal orientation of the gripping means around the vertical axis and dispose the gripping jaws in their desired positions of horizontal orientation.

3. A device according to claim 2 wherein the projection is provided upon the article gripping means and the recess upon the support.

4. A device for use in positioning an article precisely in a location and position of orientation comprising:

an article gripping means and a support carrying the article gripping means;

the article gripping means having at least two relatively movable gripping jaws and being movable between an upper position close to the support and a lower position spaced from the support and in which the article gripping means is freely angularly orientable horizontally around a vertical axis of the support to enable the jaws during closing to engage, become correctly positioned relative to, and then grip the article before raising it, the article gripping means in its lower position also being freely movable horizontally relative to the vertical axis of the support in an infinite number of linear directions to move the gripping jaws away from the vertical axis;

means to move the article gripping means to move the gripping jaws into horizontal locations relative to the vertical axis comprising at least one arcuate surface on the article gripping means which coacts with an arcuate surface on the support as the article gripping means moves into its upper position, each of the arcuate surfaces extending in arcuate form around the vertical axis and, at any section normal to a tangent to the surface, being inclined relative to the vertical axis;

and angle orientation correction means for effecting change in the angle of horizontal orientation of the gripping means around the vertical axis after the gripping means has been moved out of the lower position whereby, with the gripping means returned to the upper position, the gripping jaws when gripping the article are disposed in positions of horizontal orientation relative to the vertical axis.

5. A device according to claim 4 wherein each arcuate surface comprises the surface of a cone.

6. A device according to claim 4 wherein each arcuate surface is also arcuate in any section normal to a tangent to the surface.

7. A device according to claim 4 wherein the article gripping means is horizontal freely movable by being slidably movably carried by a carrier which is movable together with the article gripping means between the upper and lower positions.

8. A device according to claim 7 wherein the carrier comprises a platform which has an upper surface slidably supporting the article gripping means and the article gripping means extends around the platform and is provided beneath the platform with the gripping jaws.

9. A device for use in positioning an article precisely in a desired location and position of orientation comprising:

an article gripping means and a support carrying the article gripping means;

the article gripping means having at least two relatively movable gripping jaws and being movable between an upper position close to the support and a lower position spaced from the support;

the article gripping means and the support each having a registration surface means, the two registration surface means registering together when the article gripping means is in the upper position to retain the article gripping means in a specific horizontal and angular disposition relative to a vertical axis of the support, and when the article gripping means is in the lower position, the two registration surface means are disengaged to allow the article gripping means to be freely angularly orientable around the vertical axis and freely radially movable relative to the vertical axis to enable horizontal positioning of the jaws, during closing, to achieve gripping contact with the article before raising it;

the two registration surface means cooperating during raising of the article gripping means into its upper position to return the article gripping means to the specific horizontal and angular disposition relative to the vertical axis with the gripping jaws holding the article.

10. A device according to claim 9 wherein the article gripping means is movable between its upper and lower positions by a piston and cylinder assembly of the support.

11. A device according to claim 9 wherein the support comprises a vertically oriented cylinder and a piston is provided within a chamber of the cylinder with an extension of the piston depending therefrom with the article gripping means carried by the extension.

12. A device according to claim 11 wherein the registration surface means comprises a pair of registration surfaces provided upon the support and another pair of registration surfaces provided upon the article gripping means, the registration surfaces of at least one pair converging and being inclined relative to the vertical axis with a registration surface of one pair slidable upon a corresponding surface of the other pair as the article gripping means is being moved into the upper position to effect change in orientation of the gripping means and dispose the gripping jaws in their specific positions of horizontal orientation.

13. A device according to claim 12 wherein one region of the cylinder spaced radially from its vertical axis is formed with one of the pairs of registration surfaces and the article gripping means is formed with the other pair of registration surfaces.

14. A device according to claim 13 wherein the one pair of registration surfaces is provided by sides of a recess formed upwardly into a lower end of a part of the cylinder which depends beyond the chamber of the cylinder.

15. A device according to claim 11 wherein the extension of the piston is provided at its lower end with a radially extending carrier for the article gripping means, the article gripping means comprising an upper portion slidably movably carried upon an upper surface of the carrier and a lower portion extending beneath the carrier and secured to the upper portion so as to be moved beneath the carrier by movement of the upper portion, the upper portion providing a clearance around the piston extension to allow for horizontal movement of the article gripping means, the lower portion carrying the gripping jaws.

16. A device according to claim 15 wherein the registration surface means comprises an upward projection of the upper portion of the gripping means spaced radially from the piston extension and the projection is formed with upwardly converging and oppositely facing sides which are spaced angularly around the extension of the piston, the said sides registering with opposed sides of an upwardly extending recess in the lower end of a part of the cylinder which depends beyond the cylinder chamber.

17. A device according to claim 16 wherein the article gripping means is freely movable horizontally relative to the vertical axis in an infinite number of directions.

18. A device according to claim 17 wherein the registration surface means further comprises at least one arcuate surface on the article gripping means which coacts with an arcuate surface on the support as the article gripping means moves into its upper position, each of the arcuate surfaces extending in arcuate form around the vertical axis and, at any section normal to a tangent to the surface, being inclined.

19. A device according to claim 18 wherein one of the arcuate surfaces is formed at the lower end of the cylinder wall and is inclined upwardly and towards the vertical axis, the other arcuate surface upon the article gripping means being similarly inclined to coact with the arcuate surface on the cylinder.

20. A device according to claim 19 wherein each arcuate surface comprises the surface of a cone.

21. A device according to claim 19 wherein the upwardly extending recess in the lower end of the cylinder forms a circumferential interruption in the arcuate surface at the lower end of the cylinder wall.

22. A device according to claim 9 wherein the article gripping means is horizontally slidably movably carried by a carrier of the support, the carrier being movable together with the article gripping means between the upper and lower positions.

23. A device according to claim 22 wherein the carrier comprises a platform which has an upper surface slidably supporting the article gripping means and the article gripping means extends around the platform and is provided beneath the platform with the gripping jaws.

24. A device according to claim 23 wherein at least one of the jaws is pivoted so that upon contact with the article as the jaws close together to grip the article, the pivoted jaw is pivoted by contact with the article surface into a desired pivotal position for gripping the article.

25. A device according to claim 23 wherein the two relatively movable gripping jaws are two opposing jaws which are movable towards one another to grip the article with each jaw being pivotable so that upon contact with the article as the jaws close together to grip the article, the jaws are pivoted by contact with the article surface into desired pivotal positions for gripping the article.

26. A device according to claim 9 wherein the article gripping means comprises a horizontally disposed piston and cylinder to relatively move the jaws.

27. A device according to claim 26 wherein the horizontally disposed piston and cylinder is operable to open the jaws and a spring return is provided for moving the jaws towards each other.

28. A device according to claim 26 wherein each of the jaws is freely pivotally mounted for engaging the article.

* * * * *